Figure 1:
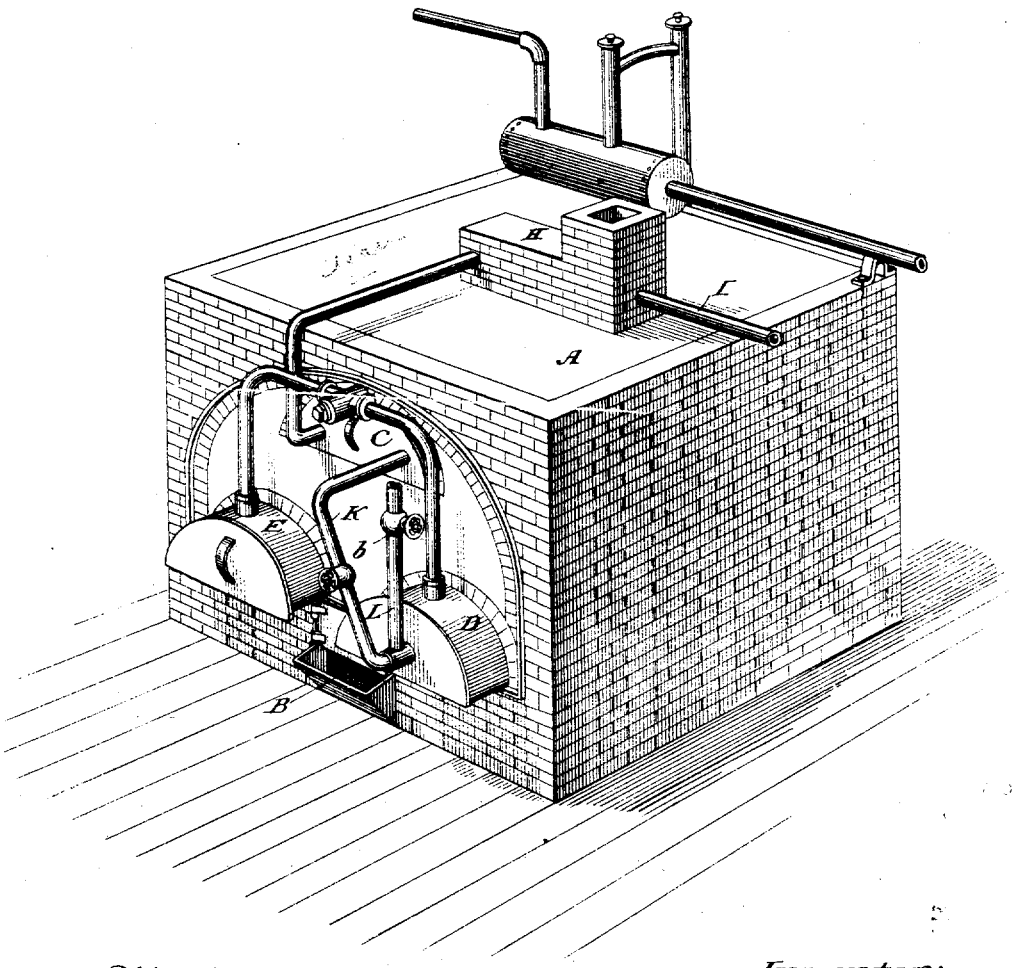

& ILLUMINATING,

93

BEST AVAILABLE COPY

2 Sheets—Sheet 1.

E. P. McCARTHY.

PROCESS OF AND APPARATUS FOR MANUFACTURING ILLUMINATING GAS.

No. 9,895. Reissued Oct. 18, 1881.

*Attest:*

R. F. Barnes

L. W. Seely

*Inventor:*

Edmund P. McCarthy by Ellis Spear

Attorney.

93

2 Sheets—Sheet 2.

E. P. McCARTHY.

PROCESS OF AND APPARATUS FOR MANUFACTURING ILLUMINATING GAS.

No. 9,895. Reissued Oct. 18, 1881.

Attest:
R. F. Barnes.
L. W. Seely

Inventor:
Edmund P. McCarthy
by Alex Spear
Attorney.

N. PETERS, Photo-Lithographer, Washington, D. C.

BEST AVAILABLE COPY

UNITED STATES PATENT OFFICE.

EDMUND P. McCARTHY, OF SAN FRANCISCO, CALIFORNIA.

PROCESS OF AND APPARATUS FOR MANUFACTURING ILLUMINATING-GAS.

SPECIFICATION forming part of Reissued Letters Patent No. 9,895, dated October 18, 1881.

Original No. 103,218, dated May 17, 1870. Application for reissue filed May 16, 1881.

*To all whom it may concern:*

Be it known that I, EDMUND P. McCARTHY, of the city and county of San Francisco, State of California, have invented an Improvement in the Process of and Apparatus for Manufacturing Illuminating-Gas; and I do hereby declare the following description and accompanying drawings are sufficient to enable any person skilled in the art or science to which it most nearly appertains to make and use my said invention or improvements without further invention or experiment.

My invention relates to certain improvements in the manufacture of illuminating-gas from crude petroleum and other hydrocarbon oils, by which I am enabled to produce a gas of superior illuminating power, and to obtain practically the best results from a given quantity of oil or other liquid hydrocarbon. To effect this I subject it to the action of heat in a thin stratum, so that all the elements are liberated at nearly the same time and unite with each other in such proportions as to form an illuminating-gas of the best quality, and in greater abundance than when coal is carbonized.

In my improved method the condensed bituminous vapors, which form tar in the ordinary process, are nearly all converted into gas, which is greatly increased in brilliancy, producing a light equal to forty-six and seventy-four one-hundredths candles.

The petroleum or other liquid hydrocarbon is led by a pipe to a point from which it is carried by a jet of the decomposed steam through a peculiar nozzle, the effect of which is to finely divide the injected ingredients and convert them into a spray or vapor, in which condition it is immediately converted into gas, being decomposed by passing through a series of passages within the retort, and finally through a mass of incandescent anthracite coal or coke, which lies on the floor of the upper chamber of the retort, and through which the combined gases must pass from beneath. From this retort it is passed directly to another, similarly arranged, where the process is completed, and the gas conveyed thence through stand-pipes to the hydraulic main.

It will thus be seen that the products of distillation, which in the ordinary process are condensed in the hydraulic main and carried off with the gas to the condenser, are in my process almost entirely converted into a gas of high illuminating power, it being entirely in the power of the operator to change the quality and quantity of the gas with the least possible trouble.

Figure 2:
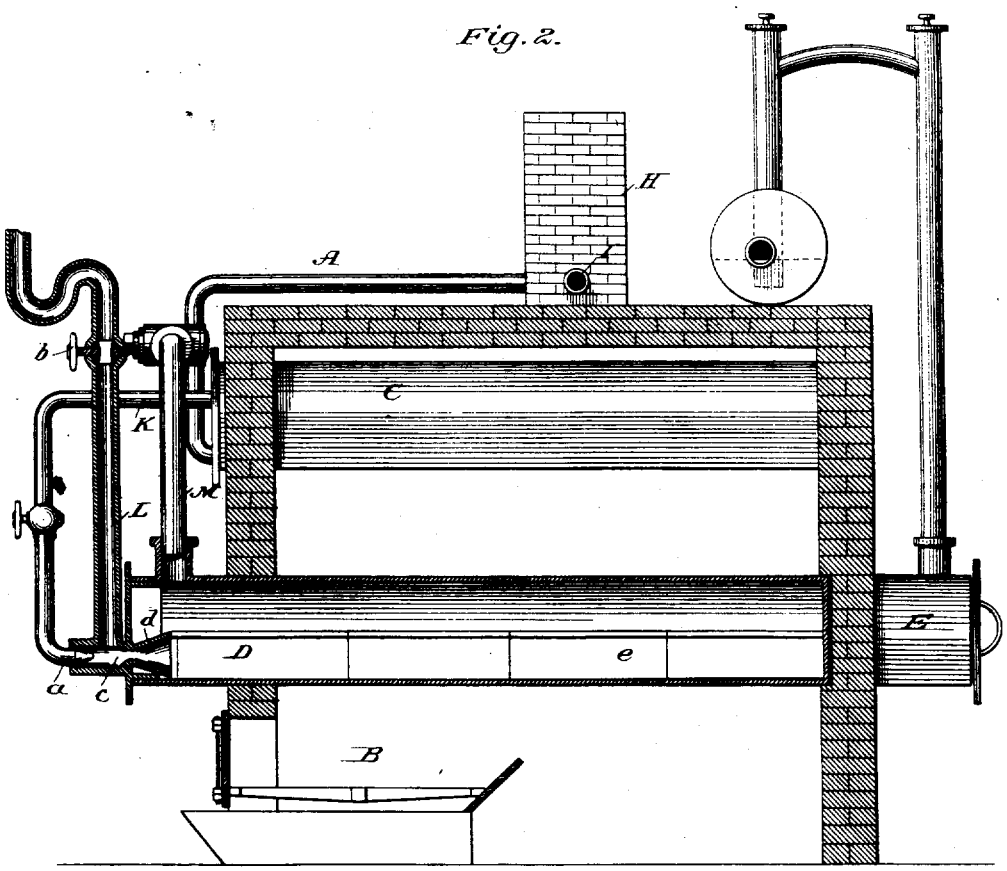
Figure 3:
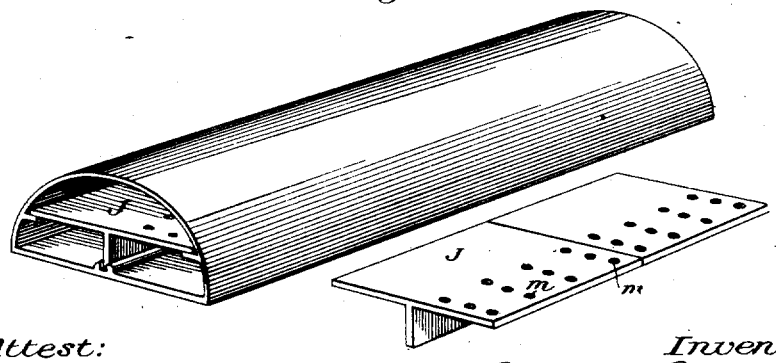

Figure 1 is a perspective view of my apparatus. Fig. 2 is a longitudinal vertical section taken centrally through retort D. Fig. 3 is a detail view of the retort.

Referring to the accompanying drawings for a more complete description of my invention, A is a furnace, which contains three retorts, that number being used for the present illustration, although I do not wish to confine myself to any particular number in construction.

B is the fire-place, which may be arranged so as to distribute and economize the heat most effectually. The waste gases and heat from the furnace B pass off through flues to the chimney H. A pipe, I, passes through the chimney and flue, and to this pipe or superheater the steam is conveyed from the boiler and is here partially dried. From this point a suitable pipe conveys the steam to the decomposer C. This decomposer has a T-shaped diaphragm, J, constructed, as shown at Fig. 3, so that it divides the vessel into three portions longitudinally. Into one of the lower chambers thus formed the superheated steam from the pipe I is conveyed and passes to the rear of the vessel. From this point it passes forward through the other lower chamber, and thence into the upper chamber. An opening is left between the two lower chambers to allow the steam to pass from one to the other. The horizontal portion of the diaphragm is pierced with holes *m* on one side and over this second chamber, so that the superheated steam rises to the upper part of the decomposer as it passes toward the front. Iron turnings or anthracite coal may be employed in this chamber, if found desirable, to increase the heating-surface and more thoroughly decompose the steam. From the decomposer the steam and hydrogen are conveyed by a pipe, K, to the jet-tube *a*, which opens just within the retort D. The oil is supplied through a pipe, L, and its flow regulated by a stop-cock, *b*. This pipe may have a siphon bend or trap above the stop-cock to prevent the escape of gas in that direction. The pipe L opens just in front of the jet-tube *a* and within the nozzle *c*. This nozzle is contracted immediately in front of the point where the oil is introduced, and expands directly afterward at *d*. The effect of this is to more completely unite the steam and gas from the pipe K with the hydrocarbon liquid from the pipe L, and the conical or bell-shaped nozzle converts the whole into a spray or vapor, which passes to the rear end of the retort through a passage constructed similarly to that before described in the retort or decomposer C. The horizontal diaphragm of this retort is covered with anthracite coal or coke heated to the point of ignition, and as the combined vapors return through the passage *e* they pass up through holes in this diaphragm and through the incandescent coal, thus becoming instantly decomposed at a heat which gives a gas of great illuminating power. From the retort D the gas and unconverted vapor pass through the pipe M into the retort E, the interior of which is constructed like the two before described, and also containing anthracite coal or coke. The process is completed in this retort, and any vapor which comes over from D will be decomposed and converted into gas.

By introducing oil in a thin stratum or spray every part of it is exposed to the heat of the retort, so that it will be almost instantly decomposed, and very little, if any, tar will be formed. The superheated steam, in addition to the elements furnished by its decomposition, serves to keep up the temperature, and no heat will be abstracted from the retorts by the introduction of the oil, as is the case where oil is introduced in a stream, or where separate charges are introduced from time to time. The apparatus thus becomes continuous, and, as very little refuse is formed, the retorts will need cleaning but rarely. When it becomes necessary to open a retort for any purpose the pipe connecting it with the others can be closed by a stop-cock, and the operation of the others is not interrupted.

To particularly identify the process herein described, and distinguish it from other attempts which have been made to manufacture a permanent gas from steam and hydrocarbons before my invention, I will specify certain steps which are necessary in order to bring th process within my invention. They are the following, viz:

First. The steam must pass through the decomposing-retort before it is mixed with the liquid hydrocarbon.

Second. The hydrocarbon oil must be introduced into the heating-chamber in such relatively small quantity, as compared with the heat, that the oil will be at once converted into vapor. It is well known that crude petroleum and similar liquid hydrocarbons will, under a comparatively slow heat, give off their lighter vapors first, and that in distilling such oil under a slow heat it is converted into vapors which constantly increase in density, and are consequently changing in character. In the process which I have described this is not the case; but, on the contrary, the heat is of such power and the quantity of oil brought into contact with the heat is so limited that all of the oil capable of being vaporized is at once converted into vapors. The vapors resulting from the lighter and heavier parts of the oil are, in consequence, all mingled together, forming a mass of vapor of one general consistency. The effect of this is important in creating a gas of uniform character.

Third. The decomposed steam is mingled with the vapors of the hydrocarbon oil in a heated chamber, and are consequently not permitted to condense before they pass into the next retort.

Fourth. The decomposed steam mingled with the vapors of the liquid hydrocarbon are then driven through a second retort containing anthracite coal heated to incandescence, and are thereby converted into a practically permanent gas.

Having thus described my invention, what I desire to secure by Letters Patent is—

1. The improved process of manufacturing gas consisting, first, in passing steam through a decomposing-retort; second, in mixing the hydrogen of the decomposed steam with hydrocarbon vapor in a heated chamber; and, third, in passing the mixture made in the heated chamber through one or more retorts containing incandescent (anthracite) coal.

2. The combination of the superheating-pipe I, decomposer C, steam or gas pipe K, oil-pipe L, and retorts D and E, when constructed and arranged to operate substantially as herein specified.

3. The improved process of manufacturing gas from oil consisting in, first, superheating and decomposing steam; and, second, in employing the resulting gaseous product to inject hydrocarbon, in the form of spray, into the gas-retorts containing incandescent material, whereby said hydrocarbon vapors are converted into illuminating-gas, as described.

4. The combination, in an apparatus for manufacturing illuminating-gas, of a gas-pipe, K, having a jet-orifice, *a*, a hydrocarbon-supply pipe, a nozzle, *c*, having double conical passage, and a retort, D, whereby the hydrocarbon is vaporized, the vapor mixed in the nozzle *c*, and, so vaporized, injected into the retort by the gas, as described.

In witness whereof I have hereunto set my hand.

E. P. McCARTHY.

Witnesses:
S. H. NOURSE,
FRANK A. BROOKS.